United States Patent [19]

Toko et al.

[11] Patent Number: 5,712,696
[45] Date of Patent: Jan. 27, 1998

[54] MANUFACTURE OF LCD DEVICE BY TRANSFERRING THE ORIENTATION STATE FROM A PARENT SUBSTRATE TO A CHILD SUBSTRATE

[75] Inventors: Yasuo Toko; Takashi Sugiyama, both of Yokohama, Japan

[73] Assignee: Stanley Electric, Co., Ltd., Tokyo, Japan

[21] Appl. No.: 387,170

[22] Filed: Feb. 13, 1995

[30] Foreign Application Priority Data

Feb. 17, 1994 [JP] Japan ................... 6-20620

[51] Int. Cl.⁶ ................ G02F 1/1337; G02F 1/13
[52] U.S. Cl. ............... 349/123; 349/126; 349/188
[58] Field of Search ............... 359/75, 76, 62, 359/90; 349/123, 126, 188

[56] References Cited

U.S. PATENT DOCUMENTS

| | | | |
|---|---|---|---|
| 4,083,797 | 4/1978 | Oh | 359/106 |
| 5,262,882 | 11/1993 | Hikmet | 359/75 |
| 5,438,421 | 8/1995 | Sugawara et al. | 359/75 |
| 5,453,862 | 9/1995 | Toko et al. | 359/76 |
| 5,473,455 | 12/1995 | Koike et al. | 359/76 |

FOREIGN PATENT DOCUMENTS

| | | |
|---|---|---|
| 0 559 172 A2 | 9/1993 | European Pat. Off. . |
| 0610923 | 8/1994 | European Pat. Off. . |
| 0610924 | 8/1994 | European Pat. Off. . |
| 55-127517 | 10/1980 | Japan ................... 359/62 |
| 6-265900 | 9/1994 | Japan ................... 359/76 |

*Primary Examiner*—William L. Sikes
*Assistant Examiner*—Walter Malinowski
*Attorney, Agent, or Firm*—Frishauf, Holtz, Goodman, Langer & Chick, P.C.

[57] ABSTRACT

A method of manufacturing a liquid crystal display device including the steps of: preparing a parent substrate having an orientation structure on the surface thereof subjected to orientation treatment; interposing primary liquid crystal material between a child substrate not subjected to orientation treatment and the parent substrate, and transferring an orientation state corresponding to the orientation structure of the parent substrate to the child substrate; separating the parent substrate and the child substrate while heating the primary liquid crystal material in an isotropic phase; and forming the liquid crystal display device by using the child substrate. At least one of the two substrates of the liquid crystal display device is not required to be subjected to direct rubbing treatment. It is therefore possible to prevent device defects and performance degradation to be caused by electrostatic charges generated by rubbing.

22 Claims, 10 Drawing Sheets

MANUFACTURE OF LCD DEVICE BY TRANSFERRING THE ORIENTATION STATE FROM A PARENT SUBSTRATE TO A CHILD SUBSTRATE

BACKGROUND OF THE INVENTION a) Field of the Invention

This invention relates to a manufacturing method of a liquid crystal display (LCD) device, and more particularly to a novel orientation treatment technique capable of forming a liquid crystal display device by using substrates not subjected to rubbing treatment.

b) Description of the Related Art

In a liquid crystal display device or so-called liquid crystal cell used in a liquid crystal display or the like, the orientation of liquid crystal molecules is changed from one particular state to another by some external action such as an application of electric field. A change in the optical property caused by a change in the orientation of liquid crystal molecules is utilized as a visual change in the display. For orientating liquid crystal molecules in a particular state, the surfaces of the glass substrates which sandwich a liquid crystal layer are usually subjected to orientation treatment.

For a conventional liquid crystal cell of a twisted nematic (TN) type, the orientation treatment is performed by a so-called rubbing method by which the orientation films of polyimide or the like formed on the surfaces of a pair of glass substrates which sandwiches liquid crystal are rubbed with a rubbing cloth in one direction.

For example, as shown in FIG. 9, a rubbing roller 10 with a rubbing cloth such as a cotton cloth wound thereabout is rotated and contacted with the orientation film 11a formed on a substrate 11, to rub the orientation film. An orientation treatment is therefore achieved in the direction indicated by an arrow B uniformly over the whole surface of the orientation film.

For a TN liquid crystal cell, rubbing treatment is performed in such a way that the orientations of liquid crystal molecules of a liquid crystal cell become orthogonal just on the inner surfaces of substrates 12 and 13. The liquid crystal molecules 14 in contact with the inner surfaces of the substrate are aligned in the orientation directions.

In the case of negative display of a liquid crystal cell, a pair of parallel Nicol type polarizers 15 and 16 with the cell interposed therebetween is disposed in such a way that one of the rubbing directions is parallel to the polarization axis of the neighboring polarizer. In the case of positive display, a pair of crossed Nicol type polarizers is disposed in such a way that the polarization axes are parallel to the rubbing direction of the neighboring substrate.

If the whole surface of a liquid crystal cell carrying active drive elements is rubbed as in the case of FIG. 9, drive elements such as thin film transistors (TFT) and metal insulator metal diodes (MIM) and other wirings formed on the surface of the cell are also subjected to rubbing through the orientation film. In this case, the drive elements and wirings may be broken by electrostatic charges generated by rubbing treatment or the performance of these elements and wirings may be damaged. Further, rubbing is likely to produce fine dust which may stick to the substrate. The stuck dust is not easily to be removed completely.

Yet further, conventional rubbing orientation treatment uniformly orientates liquid crystal molecules. As a result, there arise the characteristics that an angle (observation direction) at which an observer can easily see a displayed screen of a liquid crystal cell is restricted in a particular angle range.

For example, the measurement results of equi-contrast curves representing a visual angle dependency of a conventional twist nematic liquid crystal display (TN-LCD) cell shows that the cell has a high contrast visual angle range restricted in a particular angle range. Therefore, such a liquid crystal cell has a visual angle dependency that the cell is easily seen from particular directions but is not so easily seen from other directions.

If a liquid crystal cell having such a visual angle dependency is utilized in a display, the contrast is extremely reduced at some angle with respect to the display surface. In more extreme case, the black and white of display are reversed.

The visual angle dependency of a liquid crystal cell can be ascribed to the pre-tilt of liquid crystal molecules caused by rubbing. The direction of pre-tilt of liquid crystal molecules coincides with the vector direction of rubbing.

With the rubbing treatment illustrated in FIG. 9, all liquid crystal molecules are orientated to have a pre-tilt angle in the same direction. As shown in FIG. 10, when a voltage is applied vertically to a liquid crystal layer, all liquid crystal molecules 14 stand up in the same direction. Since the standing state of each liquid crystal molecule changes with the direction (visual angle indicated by an arrow) of an observer 17 seeing it, a visual angle dependency occurs.

Divided orientation has been proposed in order to reduce a visual angle dependency and broaden a visual angle range. This divided orientation treatment technique allows each pixel to have substantially an isotropic visual angle property, for example, by dividing the pixel into a plurality of small areas and by using different or opposite orientation directions for the respective small areas.

FIGS. 11 and 12 show examples of two-division orientation (for example, refer to "Japan Display", 1992, p. 591). In the example shown in FIG. 11, an orientation film 22 having a large pre-tilt angle and an orientation film 23 having a small pre-tilt angle are selectively formed on upper and lower substrates 20 and 21 in the area of one pixel. After the orientation film 23 is formed on the whole surface of the substrate, the orientation film 22 is selectively formed. The orientations of the orientation films 22 and 23 may be reversed or the areas of the orientation films 22 and 23 may be patterned in particular shapes.

In the example shown in FIG. 12, rubbing is performed in opposite directions in two divisional areas of a pixel. An orientation film 23 is formed on the whole surface of an upper substrate 20 and rubbing is performed in the same direction. An orientation film 22 is formed on the whole surface of the lower substrate 21 and rubbing is performed in opposite directions in two divisional areas of a pixel.

The divisional orientation treatment such as shown in FIGS. 11 and 12 requires patterning a divisional small area on each substrate by photolithography using a photoresist or by other patterning processes. The manufacturing steps of a liquid crystal cell therefore increase and the cost rises.

Orientation treatment for four divisional areas is considered to be better than for two divisional areas because the former can obtain a better isotropic visual angle performance. However, the number of divisional areas is practically two at a maximum in the case of the orientation treatment shown in FIG. 11. The orientation treatment shown in FIG. 12 is not practical because the number of processes is two times as large as general orientation treatment.

SUMMARY OF THE INVENTION

It is an object of the present invention to provide a method of manufacturing a liquid crystal display device capable of dispensing with rubbing treatment for at least one substrate of the liquid crystal cell and decreasing the device defects or degraded performance to be caused by electrostatic charges generated during rubbing.

It is another object of the present invention to provide a method of manufacturing a liquid crystal display device capable of realizing divided orientation treatment and obtaining an isotropic visual angle property, without greatly complicating the manufacturing processes.

According to one aspect of the present invention, there is provided a method of manufacturing a liquid crystal display device including the steps of preparing a parent substrate having an orientation structure on the surface thereof which has been subjected to orientation treatment, and interposing primary liquid crystal material between a child substrate not subjected to orientation treatment and the parent substrate, and transferring an orientation state corresponding to the orientation structure of the parent substrate to the child substrate.

Desired orientation treatment is performed in advance for a parent substrate to be used as a master plate. The parent substrate and a child substrate to be used as a real liquid crystal cell are mounted facing each other, and primary liquid crystal material is injected into the space between the parent substrate and the child substrate. The primary liquid crystals are orientated in accordance with the orientation state of the parent substrate, and the liquid crystal molecules at the interface of the child substrate are also orientated. Accordingly, the orientation state corresponding to that of the parent substrate is transferred to the child substrate without performing orientation treatment. The orientation state once transferred is preserved (because of the memory effect) by the liquid crystal molecules attracted and attached to the interface of the child substrate even after the parent and child substrates are separated. Therefore, by using a single parent substrate, a number of child substrates transferred with the orientation state of the parent substrate can be manufactured without rubbing treatment. The child substrate manufactured in this manner may be used as the next generation parent substrate.

As described above, basically, orientation treatment such as rubbing treatment is not required for a substrate which constitutes a cell, or rubbing is not necessary for a substrate formed with active drive elements such as TFTs and MIMs. Accordingly, the problems of device defects and performance degradation by electrostatic charges generated by rubbing can be alleviated.

Further, a parent substrate once formed can be used semi-permanently as a master plate. In the case of split orientation configuration, only a parent substrate is subjected to complicated orientation treatments by using photolithography or the like and a number of child substrates transferred with the orientation state of the parent substrate can be manufactured without any orientation treatment. Accordingly, the mass production advantages are increased and the cost can be reduced.

Four-division orientation having a visual angle performance superior to two-division orientation can also be achieved.

DETAILED DESCRIPTION OF THE PREFERRED EMBODIMENTS

Manufacturing methods of liquid crystal display devices according to embodiments of the invention will be described with reference to FIGS. 1A to 4B. In the embodiments, two-division orientation such as shown in FIG. 1C will be described by way of example. A liquid crystal display device LCD has a number of pixels PX disposed in a matrix. Each pixel PX has a rectangular shape such as a square and is constituted by two sub-pixel areas PXa and PXb.

Figure 1A:
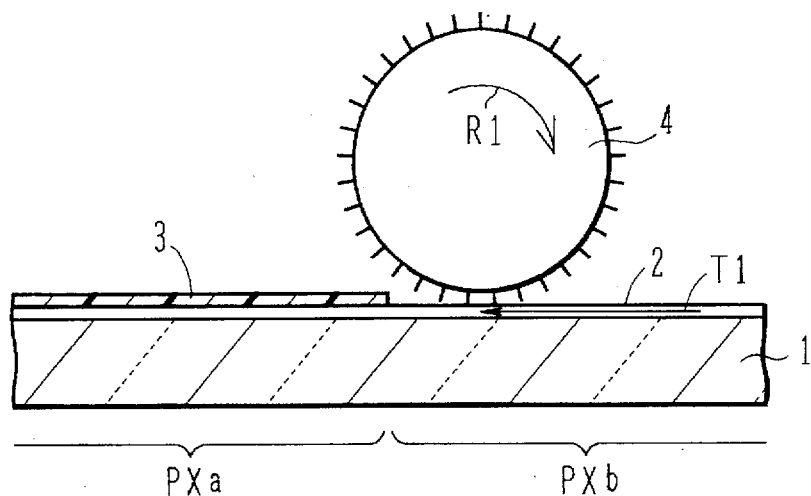
FIGS. 1A to 1D are cross sectional views and plan views explaining the processes of forming a parent substrate with two or four division orientation according to an embodiment of this invention.
Figure 1B:
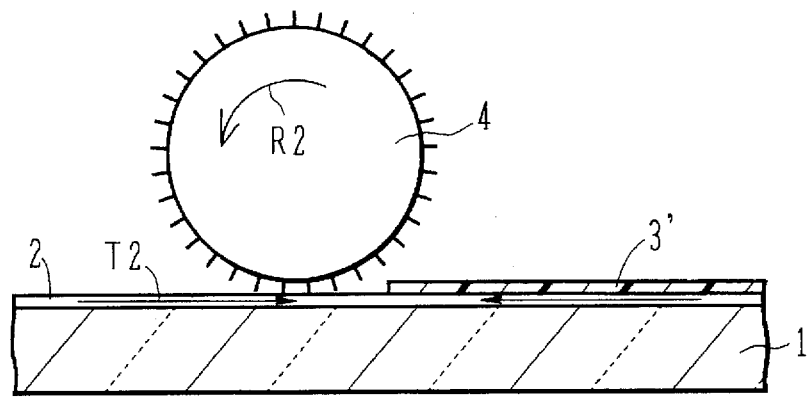
Figure 1C:
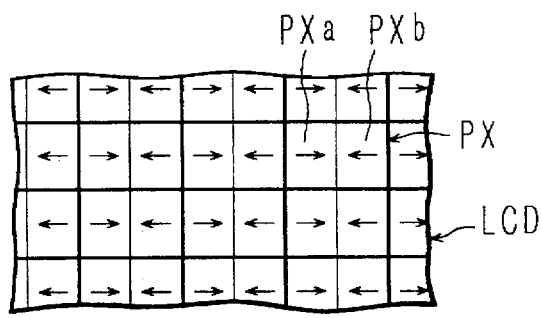

FIGS. 1A and 1B illustrate the processes of forming a parent substrate to be used as a master plate. An orientation film 2 is formed directly on a glass substrate 1. A resist pattern 3 is formed covering a sub-pixel area PXa and exposing another sub-pixel area PXb.

The orientation film 2 and photoresist pattern 3 can be formed by well-known processes. For example, the orientation film 2 can be formed by a film of polyimide, polyamide, polypeptide alcohol by means of spin coating or printing. The photoresist pattern 3 can be formed by coating general photoresist such as OFPR800 available from Tokyo Ohka Kogyo Co., Ltd., Japan by means of spin coating or roll coating and removing unnecessary areas by means of exposure and development.

First, as shown in FIG. 1A, the rubbing process for the orientation film 2 is performed by rotating a rubbing roller 4 in the direction (clockwise direction) indicated by an arrow R1 and rubbing the surface of the orientation film 2 on the substrate 1 with the photoresist film 3, while providing a relative motion of the rubbing roller 4 and substrate i in the direction indicated by an arrow T1.

The rubbing roller 4 has a rubbing cloth such as a cotton cloth wound about the roller surface. The rubbing process using the rubbing roller 4 can be performed by a well-known method. With the rubbing process illustrated in FIG. 1A, only the area not covered with the photoresist film 3 but exposing the orientation film 2 is rubbed in the orientation direction from the right to the left as viewed in FIG. 1A.

Next, the photoresist film 3 shown in FIG. 1A is removed and a new photoresist film is coated. The new photoresist film is patterned to form a photoresist pattern 3' which covers the sub-pixel area PXb already rubbed and exposes the other sub-pixel area PXa, as shown in FIG. 1B.

The rubbing roller 4 is rotated in the opposite direction (counter clockwise direction) indicated by an arrow R2 to rub the surface of the orientation film 2, while providing a relative motion of the rubbing roller 4 and substrate 1 in the direction indicated by an arrow T2. With the rubbing process illustrated in FIG. 1B, only the area not covered with the photoresist pattern 3' but exposing the orientation film 2 is rubbed in the orientation direction from the left to the right as viewed in FIG. 1B.

The photoresist pattern 3' on the orientation film 2 is thereafter removed. The processed orientation film 2 on the substrate 1 has two divisional sub-pixel areas PXa and PXb having opposite orientation directions shown in FIG. 1C. In this manner, a parent substrate to be used as a master plate is formed.

A parent substrate has the orientation film 2 directly formed on the glass substrate. Therefore, as compared to the manufacturing processes of forming electrodes and active elements on a substrate and thereafter an orientation film is formed on the substrate, the parent substrate can be manufactured more easily. Further, since a flat surface can be easily obtained, it is easy to realize uniform rubbing.

If pairs of two sub-pixel areas having the opposite orientation directions are partitioned by areas which are not necessary to be subjected to orientation treatment, the unnecessary areas are covered with a photoresist pattern and the rotation direction of the rubbing roller 4 is changed for two sub-pixel areas to change the orientation directions. In this case, a photoresist pattern may be formed only once.

If the position control precision of the rubbing roller 4 is very high, divisional orientation treatment may be performed only by controlling the position of the rubbing roller 4 without using a photoresist pattern. Rubbing treatment may be performed by rubbing the surface of the orientation film 2 by another means other than the rubbing roller 4.

The parent substrate formed as above is used for transferring the orientation pattern to a child substrate, and is not used for assembling an actual LCD device. The parent substrate can therefore be used theoretically a desired number of times. It is therefore possible to reduce the unit cost of forming a parent substrate included in the cost of forming liquid crystal display devices.

Figure 1D:
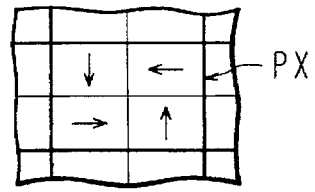

The actual productivity in obtaining the orientation structure of a parent substrate can be made to be scarcely affected, even if a multi-division orientation such as four-division orientation shown in FIG. 1D is used in place of two-division orientation, or even if methods not excellent in mass production (such as an oblique incidence deposition film, an Langmuir-Blodgett (LB) film, an optical orientation film, and a pulled high polymer film) are used in place of rubbing.

Figure 2A:
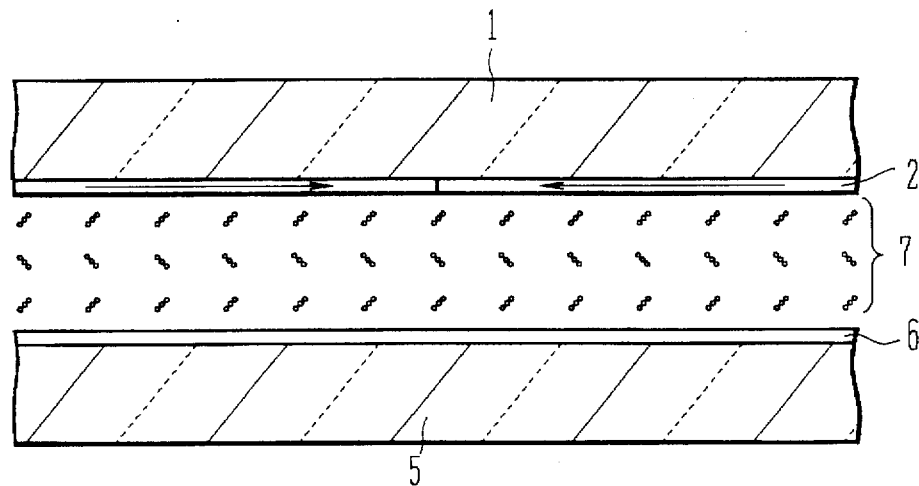
FIGS. 2A to 2C are cross sectional views of a liquid crystal cell explaining the processes of transferring an orientation state from a parent substrate of two-division orientation to a child substrate according to an embodiment of this invention.

Next, the processes of transferring an orientation state from a parent substrate to a child substrate will be described with reference to FIGS. 2A to 2C. As shown in FIG. 2A, a parent substrate 1 formed by the processes illustrated in FIGS. 1A and 1B is positioned facing a child substrate 5 to which the orientation state is transferred. An orientation film 6 not subjected to orientation treatment is formed on the child substrate. The orientation film 6 is formed, for example, by a polyimide film, a polyamide film, a polyvinylalcohol film, an $SiO_2$ film, or an ITO (indium—tin—oxide) film. The child substrate 5 is used for an actual LCD device and is formed with electrodes and the like necessary for display.

Figure 2B:
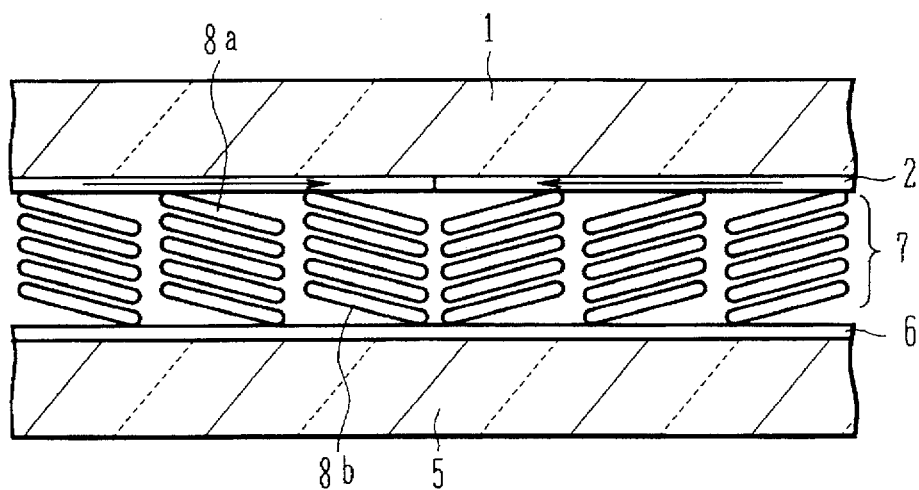
Figure 2C:
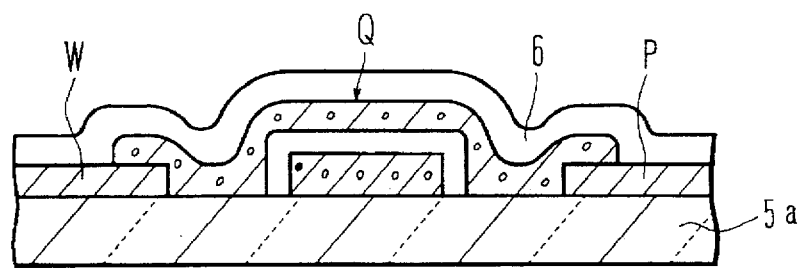

FIG. 2C shows an example of the structure of a child substrate. A wiring or electrode W, a pixel electrode P, and a thin film transistor Q are formed on a glass substrate 5a. The wiring W is connected via the transistor Q to the pixel electrode P. For example, the wiring W and pixel electrode P are made of ITO, the electrode of the thin film transistor is made of doped polycrystalline silicon, the channel thereof is made of polycrystalline silicon, and the gate insulating film thereof is made of silicon oxide. An orientation film 6 covers these elements and the remaining surface of the glass substrate 5a.

The space between the parent substrate 1 and child substrate 5 is not required to be hermetically sealed by using sealing members. The space or gap between the substrates is not required to be set to a particular value, provided that a nematic liquid crystal is used for transferring the orientation pattern. However, in order to transfer an orientation state clearly and sharply, it is desired that the gap is small and uniform as much as possible.

Nematic liquid crystal material 7 not containing chiral agent and heated and transformed into an isotropic state is injected into the space between the facing parent substrate 1 and child substrate 5. Injecting liquid crystals into the gap between the substrates may be achieved by using methods such as vacuum injection and capillary tube (surface tension) injection. Liquid crystals may be dispensed on the surface of one of the substrates, and the other substrate is thereafter superposed thereon. Such kind of operation will also be called injection of liquid crystal.

After the liquid crystal material 7 is injected, it is gradually cooled to a temperature lower than the phase transition temperature (e.g., a room temperature) to transform the phase into a nematic phase. In this case, as shown in FIG. 2B, liquid crystal molecules 8a at the interface of the orientation film 2 of the parent substrate are orientated in the orientation direction of the parent substrate 1. Liquid crystal molecules in the right and left sub-pixel areas PXa and PXb are orientated at opposite tilt angles. Orientation gradually progresses over the whole thickness of the liquid crystal layer. The liquid crystal molecules at the interface of the orientation film 6 of the child substrate 5 facing the parent substrate 1 are also orientated. At this state, the orientation state of the parent substrate 1 has been transferred or translated to the child substrate 5. The parent substrate 1 may be gradually cooled while maintaining it at a lower temperature than the child substrate 5. In this case, better orientation is likely to be obtained.

Since the liquid crystal material 7 does not contain chiral agent, liquid crystal molecules 8 are not twisted in the thickness direction. Therefore, substantially the same orientation state (in the sense of mirror image) of the parent substrate is transferred to the child substrate 5. However, as seen from FIG. 2B, the tilt angle is reversed at the child substrate 5 from that at the parent substrate 1. It is desired to prepare a suitable parent substrate for obtaining desired pattern shape and tilt angle at a child substrate.

A transferred child substrate may be used as a parent substrate of the second generation for transferring its orientation state to a child substrate of the second generation not subjected to orientation treatment. In this case, the parent substrate of the second generation may not have electrodes and drive elements, like the parent substrate of the first generation. The tilt angle of the child substrate of the second generation is the same as that of the parent substrate of the first generation. Nematic liquid crystal material containing a proper amount of chiral agent and transformed into an isotropic phase may be injected. A twist angle corresponding to the amount of added chiral agent and the gap, is added to liquid crystal molecules. Therefore, the orientation state of the parent substrate 1 added with the twist angle is transferred to the child substrate 5.

If the cell thickness is not uniform when liquid crystals containing chiral agent are used, a child substrate has orientation directions which differ at respective positions of the substrate. It is therefore desired to strictly control and manage the gap at a constant value when liquid crystals containing chiral agent is used.

Liquid crystal molecules at the interface have the characteristics that the molecules once attracted and attached or anchored to the surface of an orientation film are not moved easily. This is generally called a memory effect. The initial orientation state of liquid crystal molecules attracted and attached to the interface of the orientation film 6 of the child substrate 5 is therefore preserved (memory effect).

Figure 3A:
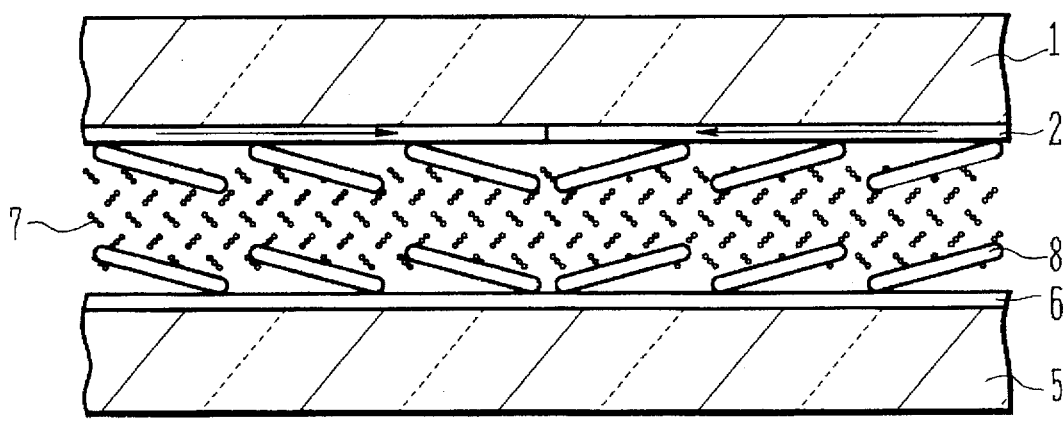
FIGS. 3A and 3B are schematic cross sectional views showing the transferred orientation structure of a child substrate according to an embodiment of this invention.
Figure 3B:
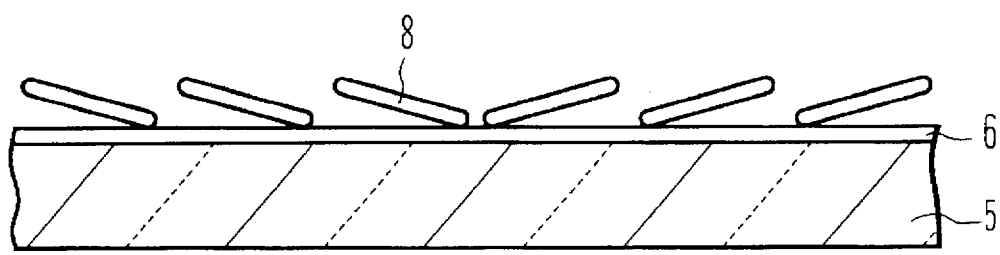

As shown in FIG. 3B, a liquid crystal layer is left on the child substrate 5 after the parent substrate 1 and child substrate 1 are separated and surplus liquid crystal material 7 is removed. The liquid crystal molecules 8 left on the child substrate 5 and attracted and attached to the orientation film preserve the orientation state shown in FIG. 2B. The left liquid crystal molecules 8 function as the orientation structure when new liquid crystal material is deposited on the child substrate 5.

If separation of the parent and child substrates is performed when liquid crystals are in a nematic state or at a low temperature, the orientation state of liquid crystals on the transferred child substrate may be disturbed in some case. It has been found that the orientation state at the transferred child substrate is hardly disturbed if the separation of the parent and child substrates shown in FIG. 3B is performed after liquid crystals other than those at the interface are changed into an isotropic phase as shown in FIG. 3A by heating them to a high temperature, particularly, a temperature higher than N-I point.

The orientation direction disturbance may supposedly result from a low anchoring energy of liquid crystal orientations on a transferred substrate, particularly a low anchoring energy in the azimuth angle direction, and hence from the motion of bulk liquid crystals caused by the separation of the substrates. As the temperature becomes high, the viscosity and elastic modulus of liquid crystal decrease, particularly, the elastic modulus of liquid crystal abruptly lowers at a temperature higher than N-I point. Therefore, even if bulk liquid crystals move when the substrates are separated, it is considered that this motion does not affect the liquid crystal orientation state of a transferred substrate.

It is also considered that as shown in FIG. 3A, the liquid crystal molecules near the interface of the orientation film are maintained to be attracted and attached to the orientation film (in a nematic state) even if the temperature is raised to make the bulk liquid crystals take an isotropic state. However, as the temperature is raised further, the liquid crystal molecules near the interface start moving because of thermal vibrations, and the transferred orientation state may be disturbed. Therefore, it is preferable to set the temperature of bulk liquid crystals in a certain temperature range higher than N-I point inclusive, when the substrates are separated.

It is desired that materials of high anchoring force resistant to heat and other physical parameters are used for the surface (orientation) film formed on a child substrate to be transferred with an orientation pattern and for the liquid crystals (primary liquid crystals). SE-510 (manufactured by Nissan Chemical Industries, Ltd., Japan) was used as the material of a polyimide surface film, and SR-9152 (manufactured by Chisso Corporation, Japan, having an N-I point at 108° C.) was used as the material of liquid crystals. With these materials, an orientation on a transferred child substrate was disturbed when the temperature was raised to 160° C. or higher. It is therefore desired that the separation process be performed in a temperature range from 108° to 160° C.

Figure 4A:
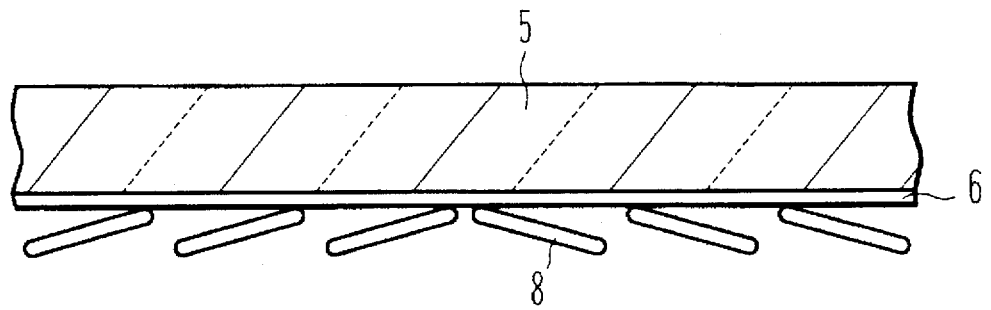
FIGS. 4A and 4B are cross sectional views explaining the processes of assembling a liquid crystal display cell according to an embodiment of this invention.
Figure 4A:
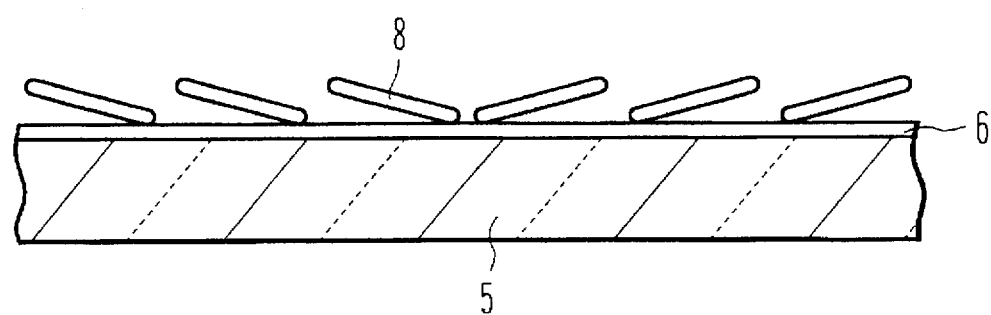
Figure 4B:
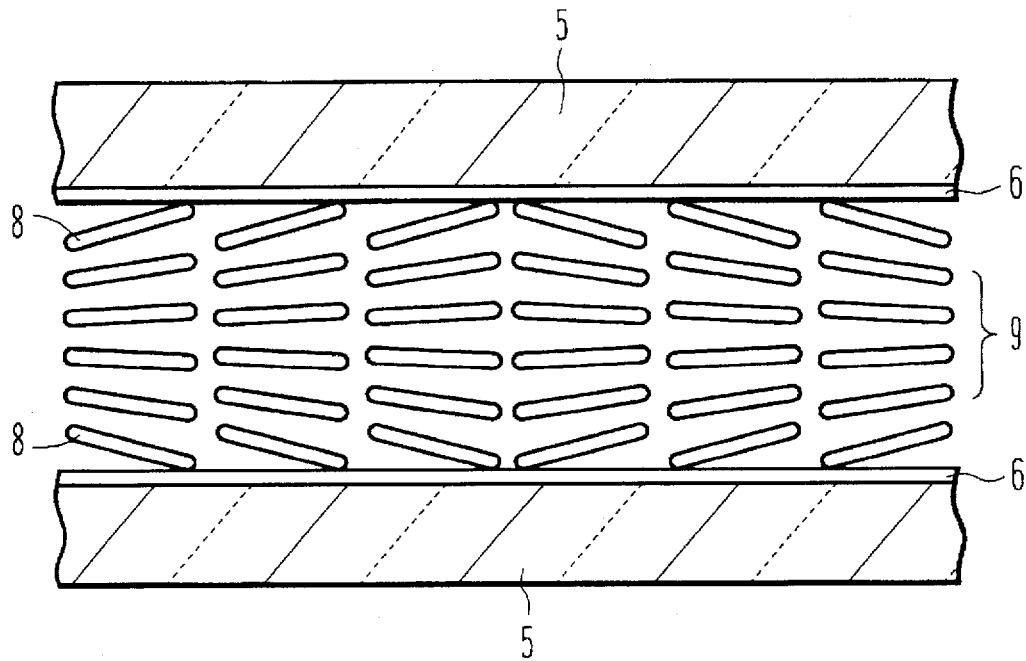

As shown in FIG. 4A, two child substrates formed in the above manner are positioned facing each other separated by a predetermined distance to assemble a cell. Although orientation films 6 have not be rubbed, attracted and attached liquid crystal molecules constitute orientation structures. As shown in FIG. 4B, two-division orientation with different pre-tilt angles can be formed by injecting liquid crystal material 9 into the space between the two child substrates.

The tilt angle of the liquid crystal cell shown in FIG. 4B changes in the liquid crystal layer, because two child substrates having orientation directions of mirror symmetry are assembled. If two different parent substrates are formed and the transferred child substrates are used for assembly of a liquid crystal cell, it is possible to form the liquid crystal cell having a constant tilt angle in the thickness direction of the liquid crystal layer.

Such a liquid crystal cell having a constant tilt angle may be formed by preparing two different parent substrates having an orientation structure of a periodical and repetitive pattern and sub-pixel areas of line symmetry in each pixel, one parent substrate having a pattern shifted by one sub-pixel area from the other parent substrate, and by using the transferred child substrates.

Figure 5A:
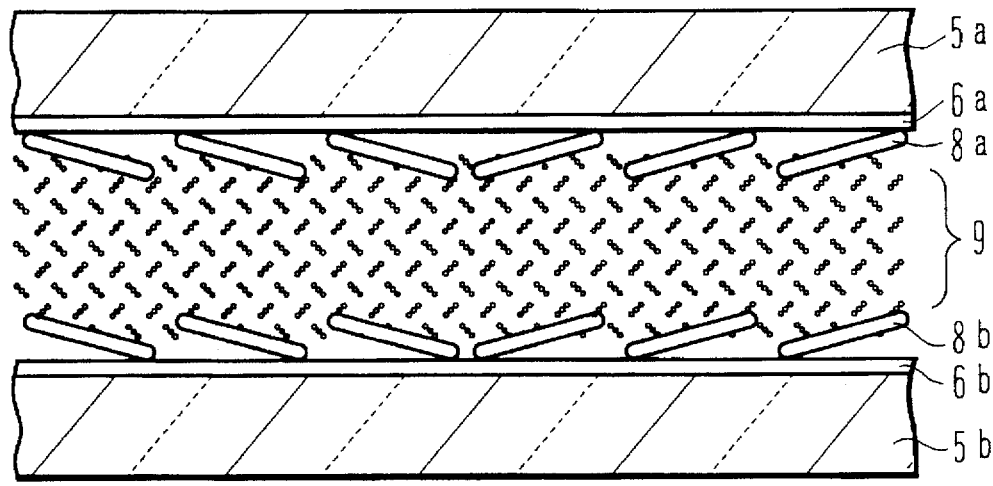
FIGS. 5A and 5B are cross sectional views explaining the processes of assembling a liquid crystal display cell according to another embodiment of this invention.
Figure 5B:
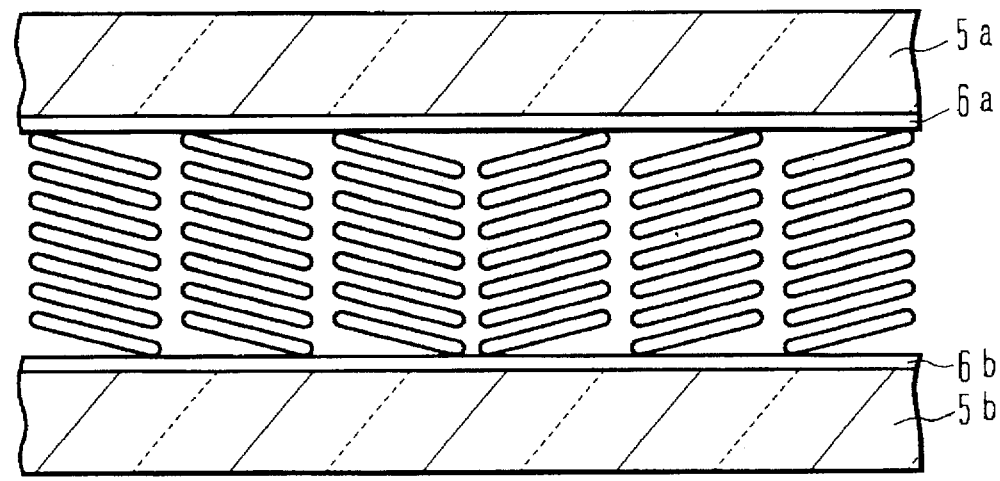

FIGS. 5A and 5B are cross sectional views explaining the assembly processes of a liquid crystal cell having a constant tilt angle. As shown in FIG. 5A, a transferred substrate 5a and another transferred substrate 5b are mounted facing each other, and liquid crystals (secondary crystal) are preferably injected under the condition of an isotropic phase.

The orientation structure 8a of liquid crystals on the substrate 5a is in translational relation with the orientation structure 8b of liquid crystals on the substrate 5b. An isotropic liquid crystal layer 9 fills the gap between the orientation structures 8a and 8b. Liquid crystal molecules in the orientation structures 8a and 8b are attracted and attached to orientation films 6a and 6b so that they don't move freely in a predetermined temperature range even if the temperature is N-I point or higher, maintaining the original orientation directions.

As shown in FIG. 5B, as the liquid crystal cell is gradually cooled, the liquid crystal layer 9 takes a nematic phase and is orientated in accordance with the orientation structures 8a and 8b. In this manner, an LCD device having desired orientation directions of liquid crystals can be formed.

Liquid crystals may be injected under the condition of a nematic phase. However, the transferred orientation has an anchoring energy not sufficiently high, and the defects may be generated. From this point, it is preferable to inject liquid crystals under the condition of an isotropic phase.

In this example, an anti-parallel cell each having a uniform orientation is formed by injecting nematic liquid crystals not added with chiral agent. If a twisted nematic cell (TN-LCD) or super twisted nematic cell (STN-LCD) is to be formed, a proper amount of chiral agent is added to liquid crystals which are then injected into the space between two substrates having desired orientation directions. Primary and secondary liquid crystals may or may not be the same.

Only one of the two substrates may be a child substrate transferred with an orientation state of a parent substrate. The other substrate shown in FIG. 4B may have an orientation film not subjected to orientation treatment or may not have an orientation film. Alternatively, only one of the two substrates shown in FIG. 4B may be a child substrate transferred with an orientation state of a parent substrate, and the other substrate is a substrate subjected to usual rubbing treatment. In this case, the child substrate is formed with active elements such as TFTs and narrow wirings, and the other substrate to be subjected to usual rubbing treatment is preferably a substrate having a structure resistive to electrostatic charges.

Figure 6A:
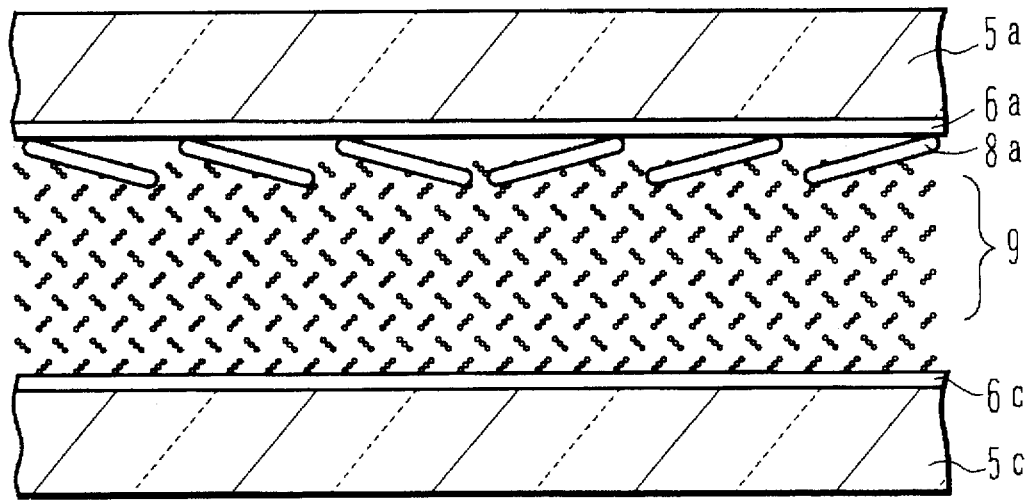
FIGS. 6A and 6B are cross sectional views explaining the processes of assembling a liquid crystal display cell according to still another embodiment of this invention.
Figure 6B:
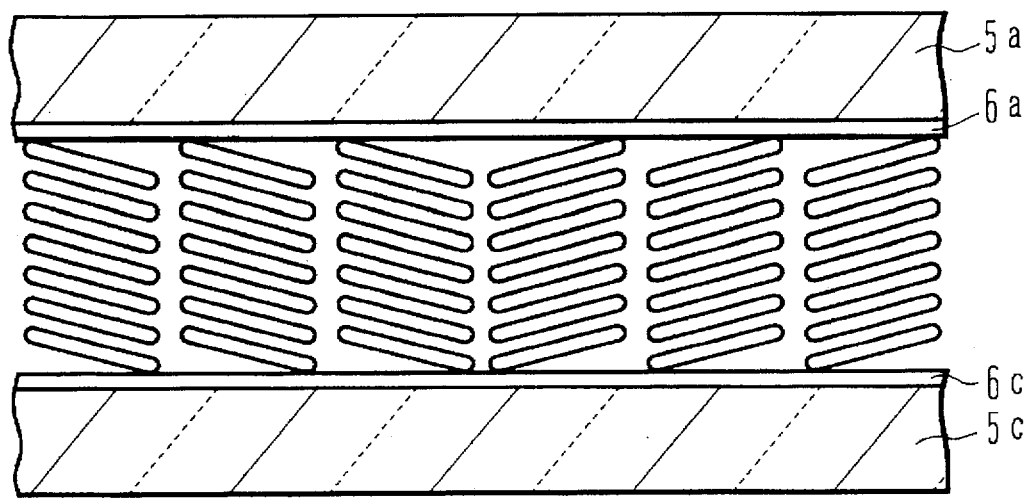

FIGS. 6A and 6B are cross sectional views explaining a method of manufacturing a liquid crystal display device according to another embodiment of the invention.

As shown in FIG. 6A, a transferred substrate 5a having an orientation structure 8a formed in the manner similar to the above embodiment and another substrate 5c not subjected to orientation treatment are mounted facing each other, and secondary liquid crystals are injected under the condition of an isotropic phase into the gap between the two substrates to form a liquid crystal layer 9 of a liquid crystal cell.

As shown in FIG. 6B, as the liquid crystal cell is gradually cooled, the liquid crystal layer 9 is orientated in accordance with the orientation structure 8a on the substrate 5a, and the orientation state propagates to the interface of an orientation film 6c on the other substrate 5c. In this manner, a liquid crystal cell having an orientated liquid crystal layer can be formed.

Injected liquid crystals in a nematic phase are likely to leave trace of flow, which will be called flow orientation, hereinafter. It is therefore preferable to inject liquid crystals in an isotropic phase.

Instead of injecting nematic liquid crystals, chiral nematic liquid crystals may be injected. If nematic liquid crystals added with a proper amount of chiral agent is injected into a liquid crystal cell and thereafter the cell is gradually cooled, twist corresponding to the amount of chiral agent is given to the liquid crystal to thereby form a twisted nematic (TN) or super twisted nematic (STN) liquid crystal display cell.

The orientation direction on the substrate 5c other than the child substrate is determined by the pitch of chiral agent added to liquid crystals and the gap between two substrates, because the substrate 5c having no orientation structure is unable to determine the directions of liquid crystal molecules. For example, in order to form a 90° C. twist TN-LCD, the cell thickness d and the chiral pitch p are adjusted to be d/p=¼.

It is preferable to use the same material of primary and secondary liquid crystals when chiral nematic crystals are used, because the thickness of the liquid crystal layer constituting the orientation structure becomes independent from the twist angle and therefore the adjustment of d/p becomes easy. The primary and secondary liquid crystals, however, are not necessarily the same material.

It is not necessary to form electrodes and active elements on the parent substrate 1 to be used for transferring an orientation state. Once a parent substrate is formed, it can be used semi-permanently so long as it preserve the orientation structure. An orientation state can be transferred to child substrates 5 substantially a desired number of times by using a single parent substrate 1. Therefore, cost burden can be lessened even if a parent substrate having a plurality of orientation areas in one pixel is formed by photolithography.

In the above embodiment, the liquid crystal material 7 is injected at the transfer process under the condition of an isotropic phase. The liquid crystal material 7 may be injected under the condition of a nematic phase (liquid crystal phase). In this case, it is preferable to perform re-orientation treatment such as heat and cool treatment in order to eliminate a flow pattern.

Figure 7A:
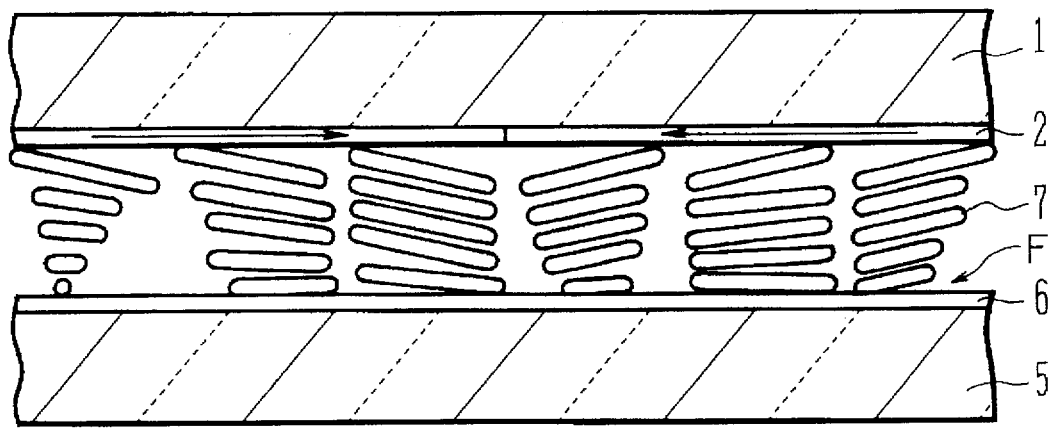
FIGS. 7A and 7B are cross sectional views explaining the processes of assembling a liquid crystal display cell according to a further embodiment of this invention.

FIG. 7A shows another example in which a parent substrate 1 having an orientation film 2 formed with an orientation structure by rubbing or other processes and a child substrate 5 having an orientation film with no orientation structure are mounted facing each other, and nematic liquid crystals 7 not containing chiral agent or nematic liquid crystals 7 added with a proper amount of chiral agent are injected into a liquid crystal cell under the condition of a nematic phase.

Since liquid crystals in a nematic phase are injected, the flow of injected crystals is left as flow orientation F. This flow orientation does not disappear easily because of the memory effect between the orientation film 6 and liquid crystal molecules.

Liquid crystal molecules at the interface of the orientation film 6 are allowed to move freely more or less if energy such as heat higher than the coupling force of liquid crystal molecules is applied to the molecules at the interface. The energy applied to liquid crystal molecules is not limited to heat, but other energies such as Light and ultrasonic wave may be used if they supply the molecules with sufficient kinetic energies.

By using the materials (SE-510, SR-9152) of the already described embodiment, liquid crystal molecules can be re-orientated by heating them to 160° C. or higher.

Figure 7B:
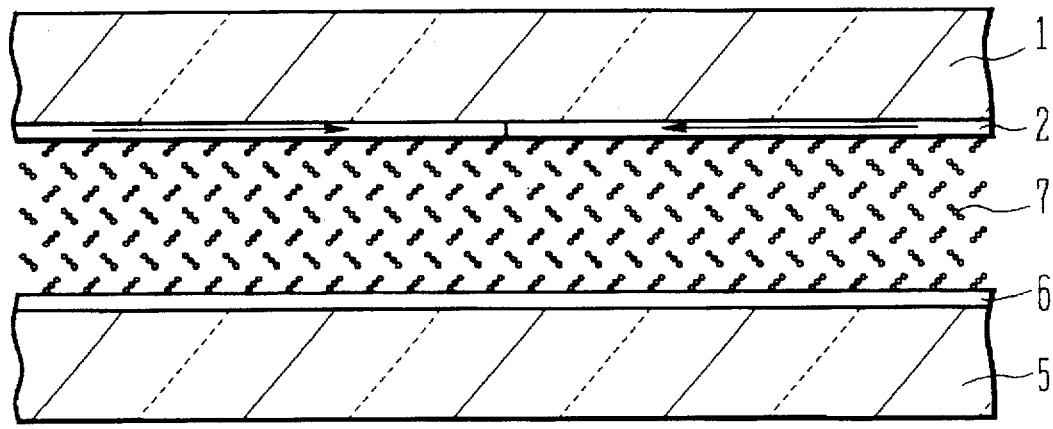

FIG. 7B shows the liquid crystal molecules re-orientated by heating the liquid crystal layer. As shown, the flow orientation has been eliminated.

As the liquid crystal cell is gradually cooled thereafter, the liquid crystal layer 7 is orientated in accordance with the orientation structure on the substrate 1 in the similar manner shown in FIG. 2B. Therefore, the orientation structure of liquid crystal molecules can be obtained also at the interface of the orientation film 6 on the substrate 5. Thereafter, the processes similar to the already described embodiment are performed.

This embodiment method transfers an orientation state on the parent substrate to the child substrate by injecting liquid crystals into the space between the parent and child substrates under the condition of a nematic phase and thereafter removing the memory effect. This method may be used for forming a liquid crystal display device.

Figure 8A:
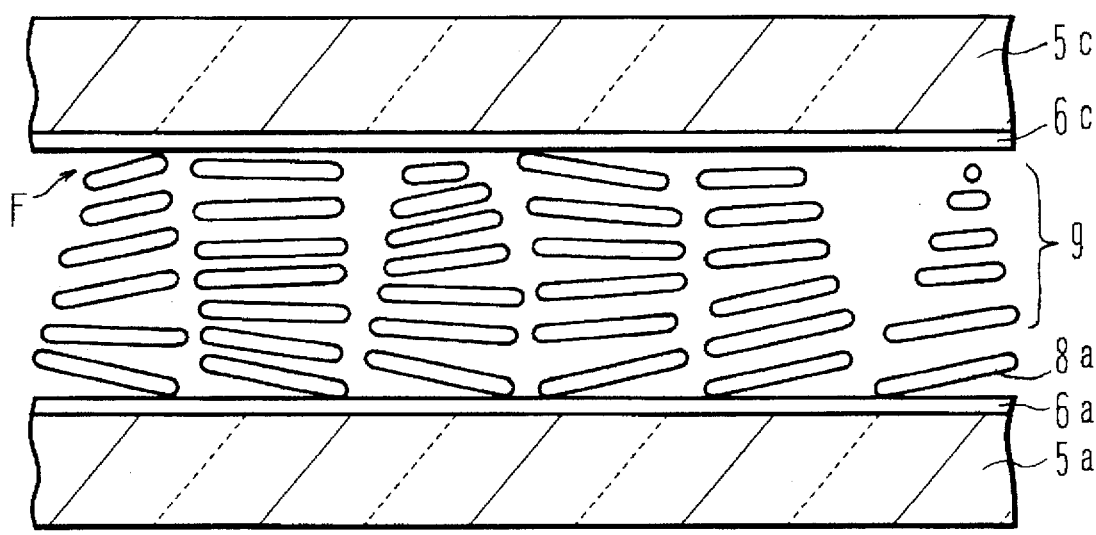
FIGS. 8A and 8B are cross sectional views explaining the processes of assembling a liquid crystal display cell according to a still further embodiment of this invention.
Figure 8B:
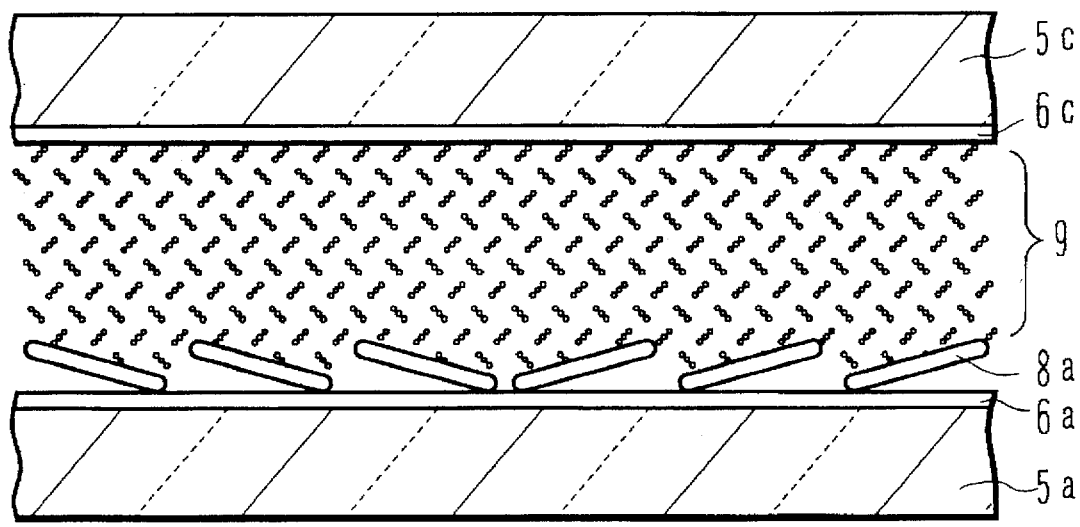
Figure 9:
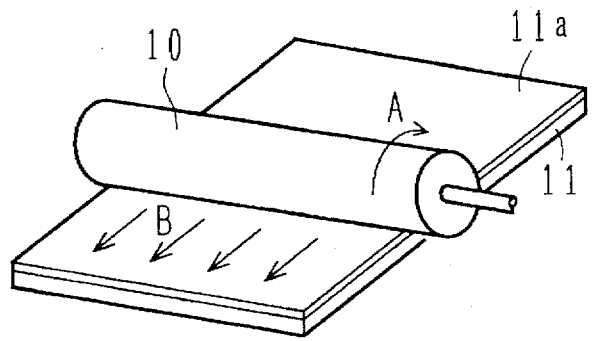
FIG. 9 is a perspective view illustrating a rubbing process according to a conventional technique.
Figure 10:
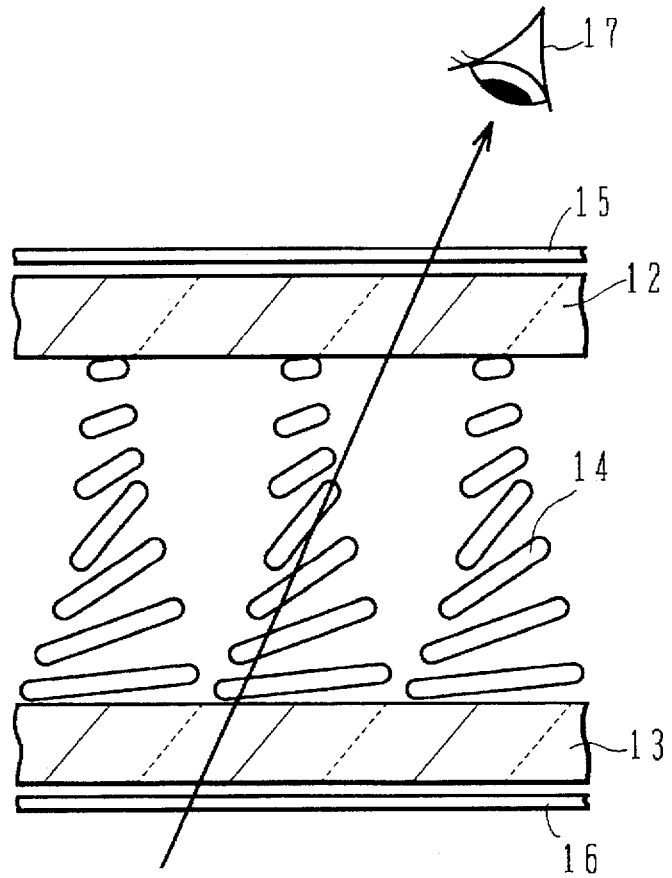
FIG. 10 is a cross sectional view of a conventional liquid crystal display device.
Figure 11:
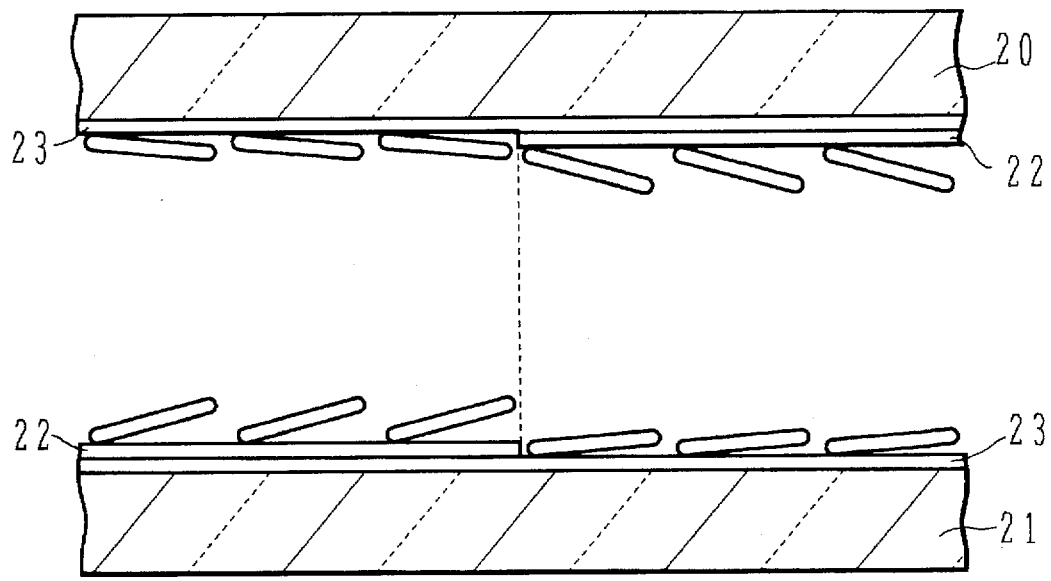
FIG. 11 is a cross sectional view of a liquid crystal display device of two-division orientation formed by a conventional technique.
Figure 12:
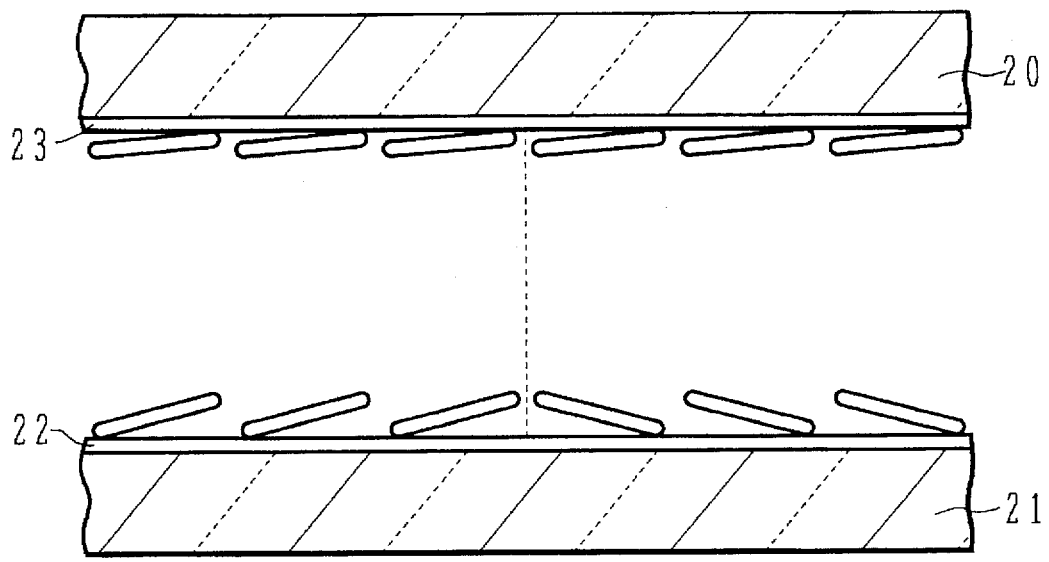
FIG. 12 is a cross sectional view of another liquid crystal display device of two-division orientation formed by a conventional technique.

FIG. 8A shows another example in which a substrate 5a transferred with an orientation state 8a in a similar manner to the already described embodiment and a substrate 5c having no orientation structure are mounted facing each other, and nematic liquid crystals 9 containing or not containing chiral agent are injected into a liquid crystal cell under the condition of a nematic phase. Since liquid crystals in a nematic phase are injected, the liquid crystal cell has flow orientation F.

This flow orientation can be eliminated by applying energy to liquid crystal molecules and removing the memory effect. However, the orientation state of the orientation structure 8a on the orientation film 6a formed by the memory effect may also be eliminated. It is therefore necessary to perform re-orientation treatment under the condition that the orientation structure transferred on the substrate 5a is not disturbed while the flow orientation on the substrate 5c is re-orientated.

This re-orientation treatment can be performed by changing the materials of the orientation films on the two substrates. Assuming that the surface film (SE-510) as described above is used for the child substrate 5a, a film capable of being re-orientated at a temperature lower than 160° C. relative to the liquid crystal material (SR-9152) is used for the surface film 6c of the other substrate 5c.

Generally, the re-orientation temperature lowers as the surface energy (polarity) of a surface film becomes small. A surface film is used which has a smaller surface energy, for example, the surface energy (48 dyn/cm) of polyimide SE-150 (manufactured by Nissan Chemical Industries. Ltd., Japan) smaller than the surface energy (52 dyn/cm) of the surface film (SE-510) of the child substrate 5a.

This surface film material is re-orientated at 140° C. or higher relative to the liquid crystal material SR-9152. Therefore, if the temperature of secondary re-orientation treatment is set to 140° C. or higher, or lower than 160° C. and the liquid crystal is gradually cooled, the flow orientation F on the substrate 5c can be eliminated without disturbing the orientation on the child substrate 5a.

The temperature range of secondary re-orientation treatment can be broadened more if material having a low glass transition point or a low polarity is used. It has been found that re-orientation can be performed at a temperature of 110° C. or lower, if polyimide having a polarity of 23 dyn/cm is used.

The same liquid crystal material 7 injected at the transfer process may be used for forming a liquid crystal cell after the parent substrate 1 is separated from the child substrate.

Liquid crystal display cells of different kinds, e.g. a TN liquid crystal cell or an STN liquid crystal cell, can be manufactured by changing the position and direction of the child substrate 5 facing the parent substrate 1 or adding chiral agent in liquid crystals to be injected.

In the above description, although the orientation structure on a substrate is formed by rubbing an orientation film such as a polyimide film, other methods may be used. For example, an orientation structure may be formed by rubbing without using an orientation film, or by selectively applying polarized light to a polarization memory film. It is desired that an orientation structure is easy to attract and attach liquid crystal molecules, has a high memory effect preserving the attachment state, and has no initial anisotropy. An orientation film may be a film made of, for example, polyimide, polyamide, polyvinylalcohol, $SiO_2$, and ITO by means of spin coating, printing, sputtering or other film forming methods. An orientation film is not necessarily required, but the surface of a glass substrate may be used as an orientation structure.

Although the above embodiments use a multi-division orientation, it is obvious that they are also applicable to general uniform orientation over the whole of a substrate. A four-division orientation structure shown in FIG. 1D or other orientation structures may be transferred to child substrates by changing the orientation pattern of a parent substrate 1.

The present invention has been described in connection with the preferred embodiments. The invention is not limited only to the above embodiments. It is apparent to those skilled in the art that various modifications, improvements, combinations and the like can be made without departing from the scope of the appended claims.

We claim:

1. In a method of manufacturing a liquid crystal display device comprising two substrates and a liquid crystal material disposed therebetween, the steps comprising:

preparing a parent substrate having an orientation structure on a surface thereof subjected to orientation treatment;

interposing primary liquid crystal material comprising liquid crystal molecules, between a child substrate not subjected to orientation treatment and said parent substrate;

transferring an orientation state corresponding to the orientation structure of said parent substrate to the liquid crystal molecules on a surface of said child substrate by gradually orienting the liquid crystal molecules of said primary liquid crystal material from the parent substrate side to the child substrate side;

separating said parent substrate and said child substrate; and injecting secondary liquid crystal material into a space between a pair of substrates facing each other and forming a liquid crystal device, at least one of said pair of substrates being said child substrate transferred with said orientation state.

2. A method according to claim 1, wherein at said transfer step, said primary liquid crystal material is disposed between said parent substrate and said child substrate in an isotropic phase, and thereafter changed into a liquid crystal phase whereby said liquid crystal molecules are orientated by the liquid crystal molecules on the surface of the parent substrate.

3. A method according to claim 2, further comprising the step of preheating said primary liquid crystal material to change the phase of said primary liquid crystal material to an isotropic phase, wherein at said interpose step, said primary liquid crystal material of said isotropic phase is injected into a space between said parent substrate and said child substrate facing each other, and at said transfer step said primary liquid crystal material is cooled to a phase transition temperature or lower whereby said liquid crystal molecules are orientated by the liquid crystal molecules on the surface of the parent substrate.

4. A method according to claim 1, wherein at said interpose step, said primary liquid crystal material does not contain chiral agent.

5. A method according to claim 1, wherein at said step of injecting secondary liquid crystal material and forming the liquid crystal display device, said secondary liquid crystal material contains chiral agent.

6. A method according to claim 1, wherein the orientation structure of said parent substrate is formed by orientation treatment preserving the orientation structure substantially semi-permanently.

7. A method according to claim 6, wherein the orientation structure of said parent substrate has a plurality of different orientation direction areas.

8. A method according to claim 7, wherein the orientation treatment of said parent substrate is performed by rubbing treatment.

9. A method according to claim 1, wherein said primary liquid crystal material at said interpose step is the same kind of material as said secondary liquid crystal material injected at said step of injecting the secondary liquid crystal material and forming the liquid crystal display device.

10. A method according to claim 1, wherein said separation step is performed while the primary liquid crystal material is maintained in an isotropic phase.

11. A method according to claim 10, wherein at said interpose step, said primary liquid crystal material does not contain chiral agent.

12. A method according to claim 10, wherein at said step of injecting the secondary liquid crystal material and forming the liquid crystal display device, said secondary liquid crystal material contains chiral agent.

13. A method according to claim 10, wherein the orientation structure of said parent substrate is formed by orientation treatment preserving the orientation structure substantially semi-permanently.

14. A method according to claim 10, wherein the orientation treatment of said parent substrate is performed by rubbing treatment.

15. A method according to claim 1, wherein at said interpose step, said primary liquid crystal material in a liquid crystal phase is injected into the space between said parent substrate and said child substrate, at said transfer step, said primary liquid crystal material is applied with energy after the injection to eliminate a memory effect between a substrate and liquid crystal molecules, and thereafter changed to a liquid crystal phase whereby said liquid crystal molecules are orientated by the liquid crystal molecules on the surface of the parent substrate.

16. A method according to claim 15, wherein said energy is heat.

17. A method according to claim 1, wherein at said step of injecting the secondary liquid crystal material and forming the liquid crystal display device, said pair of substrates includes said child substrate transferred with said orientation state and another substrate not subjected to orientation treatment.

18. A method according to claim 17, wherein said other substrate has a surface of such characteristic that allows said liquid crystal molecules to move freely at an interface of said other substrate with a lower energy than at an interface with the orientation structure of said child substrate.

19. A method according to claim 18, wherein said step of injecting the secondary liquid crystal material and forming the liquid crystal display device injects said secondary liquid crystal material in a liquid crystal phase into a space between said pair of substrates, supplies energy to said injected secondary liquid crystal material, the energy having a level of not losing memory effect of the child substrate and losing memory effect of the other substrate, and thereafter gradually cools said injected secondary liquid crystal material.

20. A method according to claim 1, wherein said parent substrate has no electrode.

21. A method according to claim 20, wherein said parent substrate is a glass substrate having an orientation film formed directly thereon.

22. A method according to claim 21, wherein said orientation film is a film made of polyimide, polyamide, or polypeptide alcohol and the orientation treatment is performed by rubbing said orientation film.

* * * * *